United States Patent
Matsuoka et al.

(10) Patent No.: US 8,651,543 B2
(45) Date of Patent: Feb. 18, 2014

(54) GRASPING APPARATUS HAVING BAG MEMBERS FILLED BY A GRANULAR SUBSTANCE

(75) Inventors: Hirofumi Matsuoka, Nagoya (JP); Masayuki Tamura, Kobe (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/641,534

(22) PCT Filed: Apr. 19, 2011

(86) PCT No.: PCT/IB2011/001139
§ 371 (c)(1),
(2), (4) Date: Oct. 16, 2012

(87) PCT Pub. No.: WO2011/135450
PCT Pub. Date: Nov. 3, 2011

(65) Prior Publication Data
US 2013/0033050 A1    Feb. 7, 2013

(30) Foreign Application Priority Data
Apr. 28, 2010   (JP) ................................ 2010-104329

(51) Int. Cl.
*B66C 1/44*   (2006.01)
(52) U.S. Cl.
USPC ......... 294/192; 294/207; 294/119.1; 294/902
(58) Field of Classification Search
USPC .............. 294/86.4, 106, 99.1, 192, 196, 207, 294/208, 119.1, 902; 901/30, 39
See application file for complete search history.

(56) References Cited

U.S. PATENT DOCUMENTS

| | | | |
|---|---|---|---|
| 3,318,629 A | 5/1967 | Brandt, Jr. | |
| 2010/0156127 A1* | 6/2010 | De Kervanoael | 294/106 |

FOREIGN PATENT DOCUMENTS

| | | |
|---|---|---|
| DE | 28 40 188 A1 | 3/1980 |
| JP | 49-077675 U | 10/1972 |
| JP | 56-114688 A | 9/1981 |
| JP | 57-102790 A | 6/1982 |
| JP | 63-058675 U | 4/1988 |
| JP | 01-037736 A | 2/1989 |
| JP | 02-218580 A | 8/1990 |
| JP | 06-206622 A | 7/1994 |
| JP | 09-123082 A | 5/1997 |
| JP | 2007-130720 A | 5/2007 |
| JP | 2007-130721 A | 5/2007 |
| JP | 2008-528408 A | 7/2008 |

OTHER PUBLICATIONS

International Search Report and Written Opinion for corresponding International Patent Application No. PCT/IB2011/001139 mailed Oct. 12, 2011.
Japanese Office Action for corresponding JP Patent Application No. 2010-104329 issued on Mar. 5, 2012.

* cited by examiner

*Primary Examiner* — Paul T Chin
(74) *Attorney, Agent, or Firm* — Sughrue Mion, PLLC

(57) ABSTRACT

The grasping apparatus includes a grasping portion for grasping a workpiece. This grasping portion has i) pawl portions having squeezing portions that squeeze the workpiece, and ii) contact portions, each of which has an inner bag made of elastic material, and a granular substance that is filled in the inner bag. The contact portions are attached to portions of the squeezing portions that contact the workpiece, and harden the granular substance while keeping it in an appropriate shape by increasing a volume ratio of the granular substance to an inner volume of the inner bags. Retaining portions that have concavo-convex shapes are formed on the attaching surfaces that are portions of the squeezing portions that the contact portions attach to.

4 Claims, 18 Drawing Sheets

SECTIONAL VIEW
TAKEN ALONG LINE A - A

SECTIONAL VIEW
TAKEN ALONG LINE B - B

SECTIONAL VIEW
TAKEN ALONG LINE C – C

SECTIONAL VIEW
TAKEN ALONG LINE D – D

SECTIONAL VIEW
TAKEN ALONG LINE E – E

F I G. 12B

| No. | Name | Material | Size | Shape | Specific gravity | Hardness [kgf] |
|---|---|---|---|---|---|---|
| 1 | Core sand | Sand | Approximately 0.1-0.4mm | Ragged with edges | 1.64 | 6.3-9.4 |
| 2 | Decoration sand | Marble | Approximately 0.5-0.8mm | Ragged with edges | 1.53 | 8.3-9.2 |
| 3 | Salt | Salt | Approximately 0.3-0.4mm | Substantially uniform cube | 1.50 | 10.1-15.2 |
| 4 | Metal powder (small) | Iron | Approximately 0.1mm | Ragged with edges | 2.81 | 13.2-13.5 |
| 5 | Metal powder (medium) | Iron | Approximately 0.3-0.7mm | Ragged with edges | 2.36 | 16.0-17.3 |
| 6 | Metal powder (large) | Iron | Approximately 0.6-1.0mm | Ragged with edges | 2.71 | 17.5-18.7 |
| 7 | Material powder (extra large) | Iron | Approximately 1.5-3.0mm | Ragged with edges | 1.67 | 12.3-12.7 |
| 8 | Shot balls (small) | Iron | Approximately 0.7-0.9mm | Uniform spherical body | 4.84 | 6.2-8.0 |
| 9 | Shot balls (large) | Iron | Approximately 0.9-1.1mm | Uniform spherical body | 4.40 | 8.0-12.3 |
| 10 | Metal balls (large) | Metal | Approximately 0.6-0.7mm | Substantially uniform spherical body | 1.81 | 2.7-3.5 |
| 11 | Metal balls (medium) | Metal | Approximately 0.1-0.2mm | Substantially uniform spherical body | 1.83 | 3.0-3.9 |
| 12 | Metal balls (small) | Metal | Approximately ≤0.1-0.1mm | Substantially uniform spherical body | 1.81 | 4.3-5.2 |
| 13 | Ceramic balls (large) | $Al_2O_3$, $SiO_2$ | Approximately 0.3-0.4mm | Substantially uniform spherical body | 1.53 | 5.7-7.8 |
| 14 | Ceramic balls (medium) | $Al_2O_3$, $SiO_2$ | Approximately 0.2-0.3mm | Substantially uniform spherical body | 1.57 | 5.2-9.7 |
| 15 | Ceramic balls (small) | $Al_2O_3$, $SiO_2$ | Approximately 0.1-0.2mm | Substantially uniform spherical body | 1.55 | 5.3-9.2 |
| 16 | Ceramic balls (micro) | $Al_2O_3$, $SiO_2$ | Approximately 0.1mm | Substantially uniform spherical body | 1.64 | 9.5-10.0 |
| 17 | Glass beads | Glass | Approximately 1.0-1.5mm | Uniform hollow body | 1.17 | 3.4-3.8 |
| 18 | Ceramic fragments (large) | $Al_2O_3$, $SiO_2$ | Approximately 0.4-0.5mm | Ragged with edges | 1.64 | 11.4-13.2 |
| 19 | Ceramic fragments (small) | $Al_2O_3$, $SiO_2$ | Approximately 0.1-0.2mm | Ragged with edges | 1.57 | 8.9-12.4 |
| 20 | Stone (GF24) | GC stone | Approximately 0.4-0.5mm | Ragged with edges | 2.10 | 11.4-13.2 |

GRASPING APPARATUS HAVING BAG MEMBERS FILLED BY A GRANULAR SUBSTANCE

BACKGROUND OF THE INVENTION

1. Field of the Invention

The invention relates to technology of a grasping apparatus capable of reliably grasping any of a plurality of types of workpieces of different shapes.

2. Description of Related Art

When handling a plurality of types of workpieces of different shapes with a grasping apparatus that grasps a workpiece or a product or the like, it is troublesome to replace a contact portion, i.e., a portion of the grasping apparatus that directly contacts the workpiece or the like, with a portion corresponding to the shape of each workpiece. Therefore, it has been hoped that a grasping apparatus capable of flexibly handling a variety of types of workpieces having different outer shapes would be developed. So, various technologies for grasping apparatuses that are capable of successfully grasping a variety of types of workpieces having different outer shapes have been examined. Japanese Patent Application Publication No. 9-123082 (JP-A-9-123082), for example, described below describes just such a technology.

JP-A-9-123082 describes a grasping apparatus provided with a contact portion capable of handling various outer shapes by encapsulating a large amount of granular substance inside a flexible membrane, and reducing the pressure in the membrane using a vacuum pump or the like, or canceling that pressure reduction. With this grasping apparatus, a contact portion is arranged at a tip end of a support device such as a robotic arm or the like. Also, with a grasping operation by the robotic arm or the like, the contact portion is made to abut against the workpiece or the like and conform to the shape of the workpiece or the like. Then the large amount of granular substance inside the membrane is held tightly and the shape of the contact portion is kept conformed to the shape of the workpiece. Also, with this grasping apparatus, the contact portion is returned to its normal shape by canceling the reduced pressure state in the contact portion. Also, using such a related grasping apparatus enables the shape of the contact portion to match the outer shapes of various workpieces and the like. As a result, when handling a plurality of various workpieces having different outer shapes, the workpieces can be stably grasped.

If the contact portion is displaced (becomes offset) with respect to the robotic arm or the like, the positioning accuracy is unable to be ensured. Therefore, the contact portion of the related art is typically firmly fixed by a method such as adhesion so that it will not be displaced with respect to the robotic arm or the like. As a result, however, it is not easy to replace the contact portion if it becomes damaged from abrasion or cutting or the like. Therefore, it is difficult to apply a grasping apparatus having a contact portion like that of the related art to a workpiece that has multiple edge portions or to a workpiece to which cutting dust is adhered.

SUMMARY OF THE INVENTION

The invention thus provides a grasping apparatus i) that is provided with a contact portion that is very resistant to abrasion and cutting, that can maintain a good grasp, and that can be replaced easily, and ii) that is able to inhibit the contact portion from being displaced with respect to a portion that the contact portion attaches to, even though the contact portion is easy to replace.

A first aspect of the invention relates to a grasping apparatus that includes a grasping portion for grasping a workpiece. This grasping portion includes i) pawl portions having a plurality of squeezing portions that squeeze the workpiece, and ii) contact portions, each of which has a bag member made of elastic material, and a granular substance that is filled in the bag member. The contact portions are attached to portions of the squeezing portions that contact the workpiece, and harden the granular substance while keeping the granular substance in an appropriate shape by increasing a volume ratio of the granular substance to an inner volume of the bag member. A retaining portion that has a concavo-convex shape is formed at a portion of each of the pawl portions that the corresponding contact portion attaches to.

According to this aspect of the invention, it is possible to inhibit the contact portions from being displaced with respect to the squeezing portions when grasping the workpiece with the grasping portion.

In the aspect described above, each of the contact portions may include an outer bag that is made of aramid fiber and that covers the bag member.

This structure makes it possible to inhibit the contact portions from being displaced with respect to the squeezing portions, while ensuring the resistance of the contact portions to abrasion and cutting.

Also, the bag member may be housed inside the outer bag in a state relatively displaceable with respect to the outer bag.

According to this structure, the bag member is able to accurately conform to the shape of the retaining portions, so the contact portions are able to be even more reliably inhibited from being displaced with respect to the squeezing portions.

Also, the granular substance may be ceramic fragments in which a shape of grains that make up the granular substance is a shape other than generally spherical.

With this structure, the contact portions can be made even harder when they are hardened, so the contact portions are able to be even more reliably inhibited from being displaced with respect to the squeezing portions.

Also, the granular substance may be such that the grains that are formed of artificial ceramic (so-called synthetic mullite) including at least $Al_2O_3$ and $SiO_2$, that has been crushed such that an average grain diameter is approximately 0.4 to 0.5 mm, inclusive, are shaped with edge portions.

Accordingly, the granular substance enables the contact portions to be made even harder when they are hardened. Also, the granular substance has a stable chemical property, so it inhibits the contact portions and the workpiece from rusting. Furthermore, the granular substance has a small specific gravity, so it enables the contact portions to be lightweight.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 5A and 5B are side views showing frame formats of a retaining portion according to the first example embodiment that is formed on an attaching surface of a pawl portion, with FIG. A being a side sectional view showing a state in which bolts are detached, and FIG. 5B being a sectional view taken along line C-C in FIG. 4 showing a state in which the bolts are screwed in;

FIGS. 12A and 12B are views illustrating a granular substance selection method, with FIG. 12A being a perspective view showing a frame format of the overall structure of a test apparatus, and FIG. 12B being a chart of the measurement results according to the test apparatus;

DETAILED DESCRIPTION OF EMBODIMENTS

Figure 1:
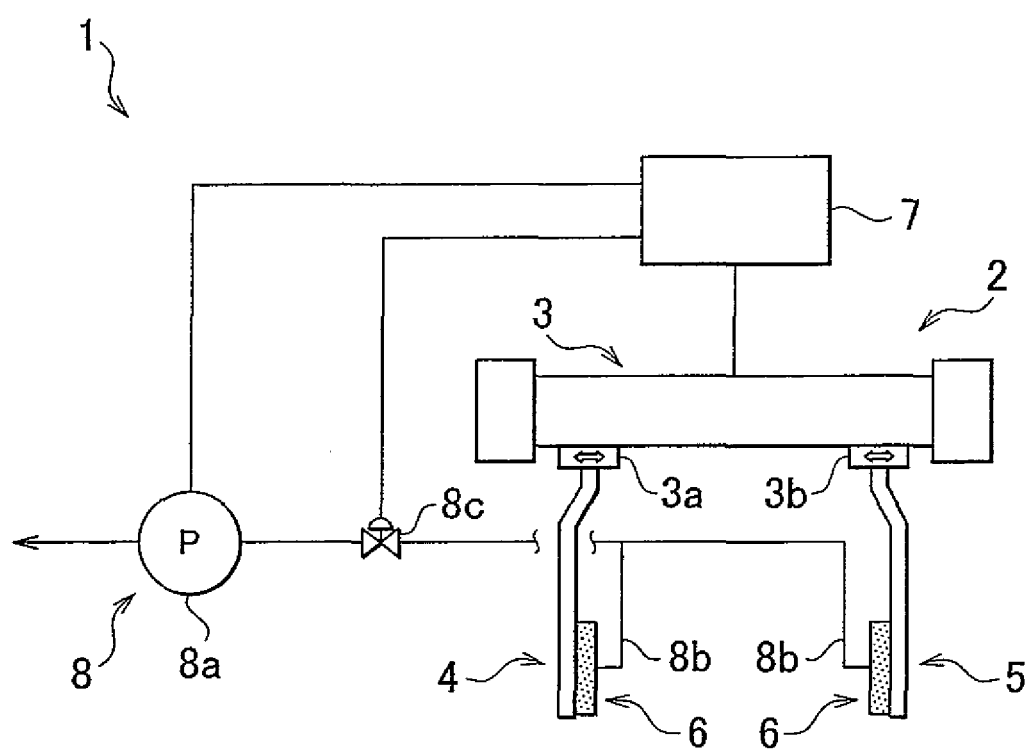
FIG. 1 is a view showing a frame format of the overall structure of a grasping apparatus according to a first example embodiment of the invention.
Figure 2A:
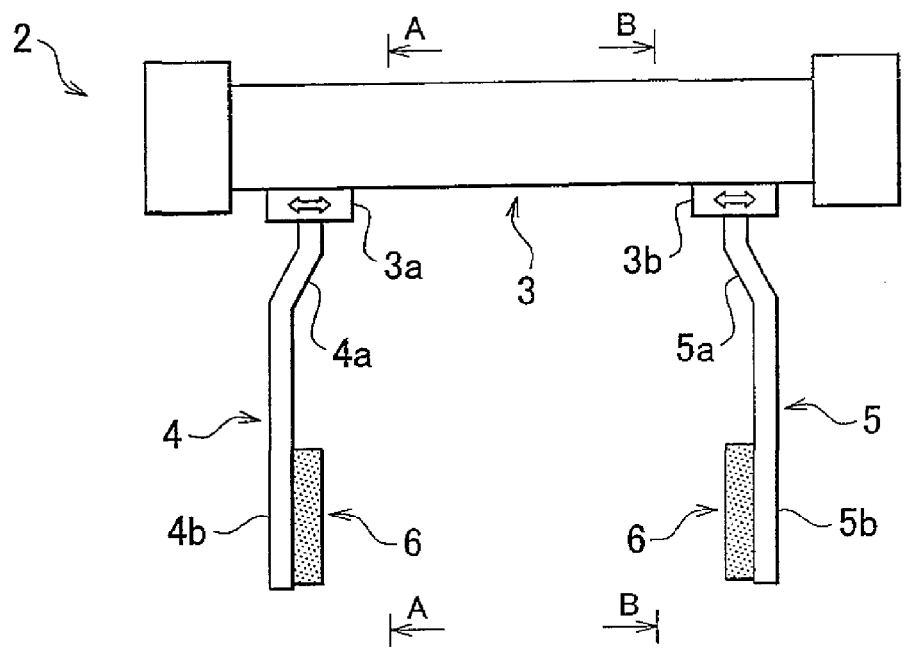
FIGS. 2A, 2B, and 2C are views showing frame formats of the grasping apparatus according to the first example embodiment of the invention, with FIG. 2A being a front view of a grasping portion, FIG. 2B being a sectional view taken along line A-A in FIG. 2A, and FIG. 2C being a sectional view taken along line B-B in FIG. 2A.

Next, example embodiments of the invention will be described. First, the overall structure of the grasping apparatus according to a first example embodiment of the invention will be described with reference to FIGS. 1 to 3. As shown in FIG. 1, a grasping apparatus 1 according to the first example embodiment of the invention is an apparatus for grasping and holding a workpiece or the like, and includes a grasping portion 2, a control device 7, and evacuation equipment 8 and the like. The grasping portion 2 is a portion of the grasping apparatus 1 that directly grasps the workpiece, and includes a driving portion 3, a plurality of pawl portions 4 and 5, and a plurality of contact portions 6 and the like.

As shown in FIGS. 1 and 2A, 2B, and 2C, the driving portion 3 is an apparatus that is provided with slider portions 3a and 3b of two systems, and is able to independently and reciprocally displace each of these slider portions 3a and 3b in the same axial direction. An electric actuator or the like that is provided with a reciprocating mechanism formed by a ball screw and nut and a motor or the like may be used as the driving portion 3.

The pawl portions 4 and 5 are a pair of portions provided for squeezing the workpiece. That is, the pawl portions 4 and 5 are portions that squeeze and hold a workpiece arranged in a position between them. Incidentally, the shapes of the pawl portions 4 and 5 are set taking into account the shape and size of the workpiece to be grasped, and the stroke amount of the slider portions 3a and 3b and the like.

Figure 2B:
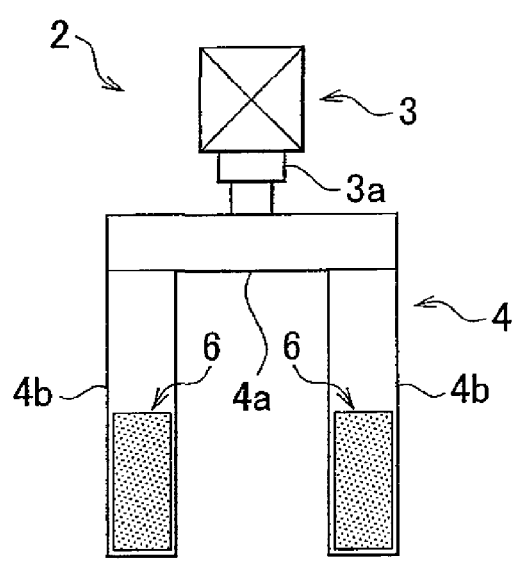

As shown in FIG. 2B, the pawl portion 4 includes a support portion 4a and two squeezing portions 4b that protrude from the support portion 4a. The squeezing portions 4b are arranged a predetermined distance apart from one another. Also, the surface of the pawl portion 4 on the side where the contact portion 6 is attached serves as an attaching surface 4g. The support portion 4a of the pawl portion 4 is fixed to the slider portion 3a. The control device 7 operates the driving portion 3 to slide the slider portion 3a such that the squeezing portions 4b move in a reciprocating manner in the sliding direction of the slider portion 3a (see FIG. 1).

Figure 2C:
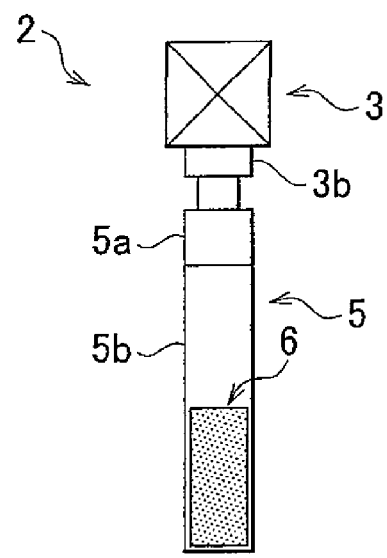

Also, as shown in FIG. 2C, the pawl portion 5 includes a support portion 5a and one squeezing portion 5b that protrudes from the support portion 5a. Also, the surface of the pawl portion 5 on the side where the contact portion 6 is attached serves as an attaching surface 5g. The support portion 5a of the pawl portion 5 is fixed to the slider portion 3b. The control device 7 operates the driving portion 3 to slide the slider portion 3b such that the squeezing portion 5b moves in a reciprocating manner in the sliding direction of the slider portion 3b (see FIG. 1).

The contact portion 6 is a portion of the grasping apparatus 1 that directly contacts the workpiece. The contact portion 6 is able to take on two opposite forms, i.e., one in which the shape of the contact portion 6 is able to flexibly deform and another in which the shape of the contact portion 6 is firmly maintained, with a single member. The contact portion 6 includes an elastic bag-shaped member and a granular substance that is filled into this bag-shaped member. Normally, the contact portion 6 takes on the form in which its shape is able to flexibly deform.

As shown in FIGS. 1 and 2A, 2B, and 2C, the contact portion 6 is attached to the squeezing portions 4b and 5b of the pawl portions 4 and 5, and is connected to the evacuation equipment 8. The evacuation equipment 8 is means for making the contact portion 6 hard and soft in the grasping apparatus 1, and includes a vacuum pump 8a, vacuum ducts 8b, and an electromagnetic valve 8c and the like. The vacuum ducts 8b are connected to bag-shaped portions of the contact portions 6. Incidentally, in this example embodiment, the vacuum pump 8a is provided in the evacuation equipment 8, but a structure in which evacuating means other than the vacuum pump 8a (such as an ejector or the like) is provided is also possible. Further, in the grasping apparatus of the invention, the means for making the contact portion hard and soft is not necessarily limited to the evacuation equipment. That is, any of various modes capable of making the contact portion hard and soft may be employed.

When the inside of the bag-shaped portion is reduced in pressure by operating the vacuum pump 8a, the contact portion 6 becomes hard due to the grains that make up the granular substance that is filled inside the bag-shaped portion being held more firmly. Therefore, at this time, the contact portion 6 takes on the form in which its shape is firmly maintained.

When this contact portion 6 is pressed, in a flexible state, against the workpiece by the squeezing pressure of the pawl portions 4 and 5, the contact portion 6 is able to fit into the concave portions and around the convex portions on the surface of the workpiece, thus enabling the contact portion 6 to conform to the shape of the outer surface of the workpiece.

Also, the contact portion 6 is able to be made hard in a shape corresponding to the shape of the outer surface of the workpiece by activating the evacuation equipment 8 while the contact portion 6 is conformed to the shape of the outer surface of the workpiece. Therefore, the hard contact portion 6 that corresponds to the shape of the outer surface of the workpiece can be formed.

Figure 3A:
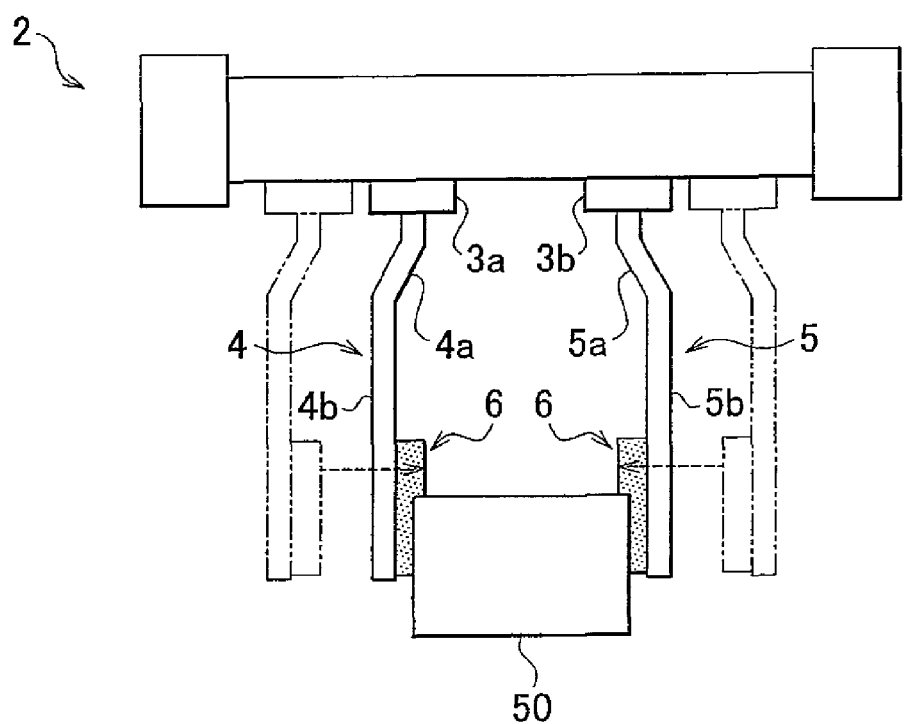
FIGS. 3A and 3B are views showing frame formats of the grasping apparatus according to the first example embodiment of the invention grasping a workpiece, with FIG. 3A being a front view and FIG. 3B being a plan view.
Figure 3B:
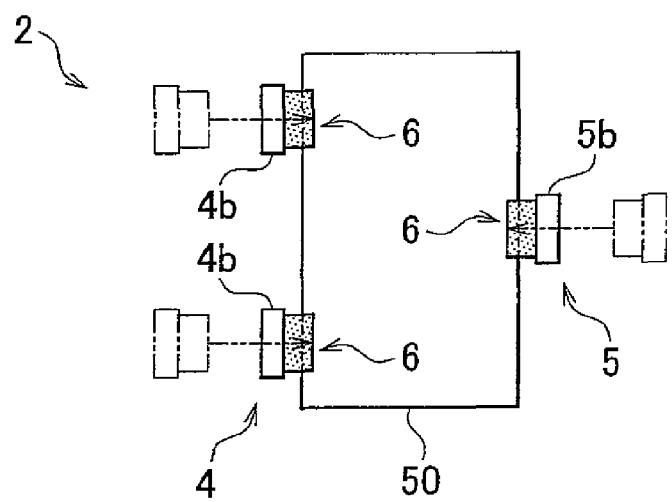

Also, as shown in FIGS. 3A and 3B, with the grasping portion 2 according to this example embodiment, a workpiece 50 can be firmly grasped at three points by the contact portions 6 that are attached to the squeezing portions 4b and 5b. Thus, a stable grasping state that is able to withstand the workpiece 50 being swung around can be realized by a simple structure with few component parts. Incidentally, in this example embodiment, a mode is described in which the workpiece 50 is supported at three points by the grasping portion 2. However, the number of points at which the workpiece is supported in the grasping apparatus of the invention is not limited to this. For example, the number of points at which the workpiece is supported may also be two, or four or more.

Figure 4:
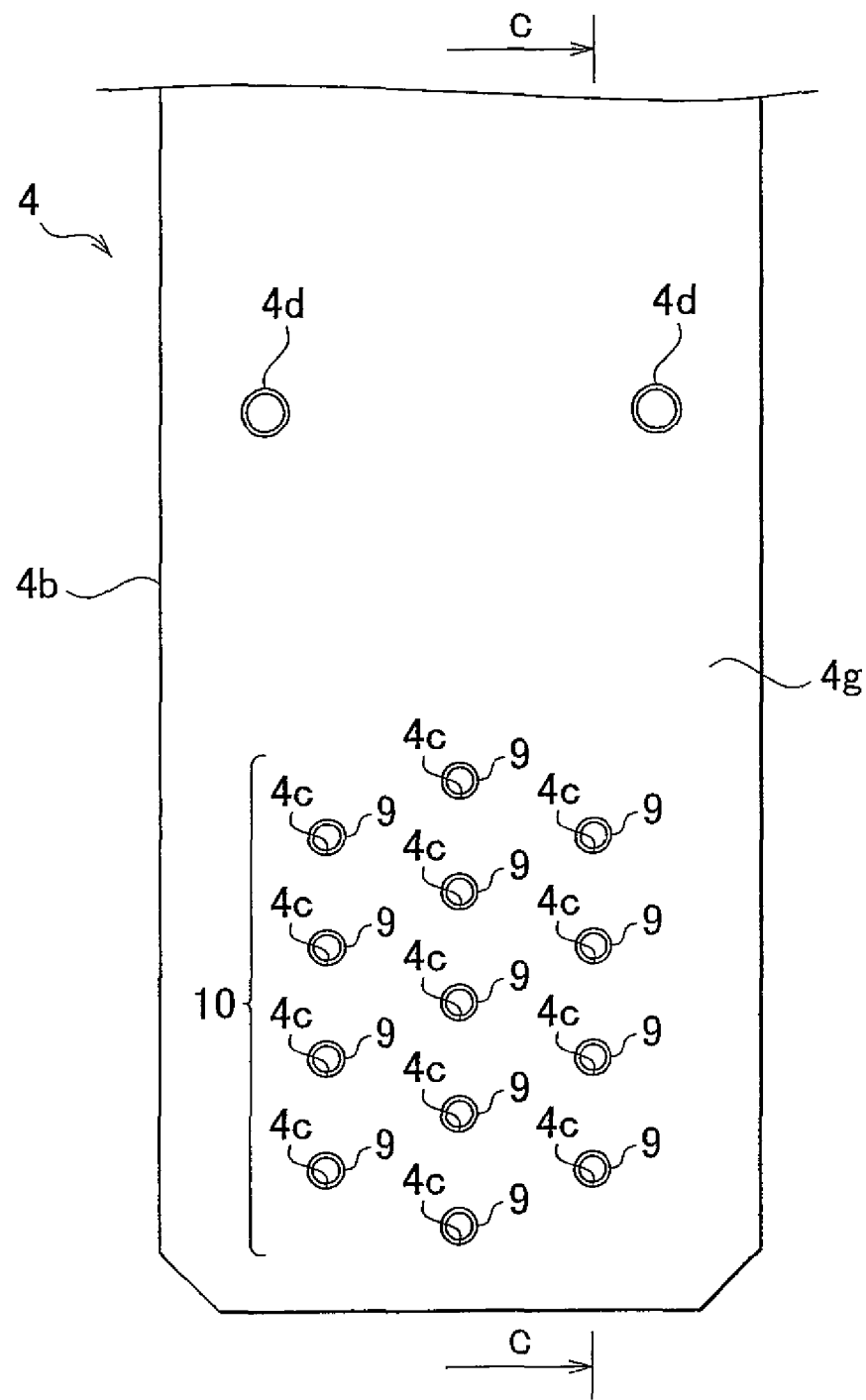
FIG. 4 is a partial detailed view showing a frame format of a squeezing portion of the grasping apparatus according to the first example embodiment of the invention.
Figure 5A:
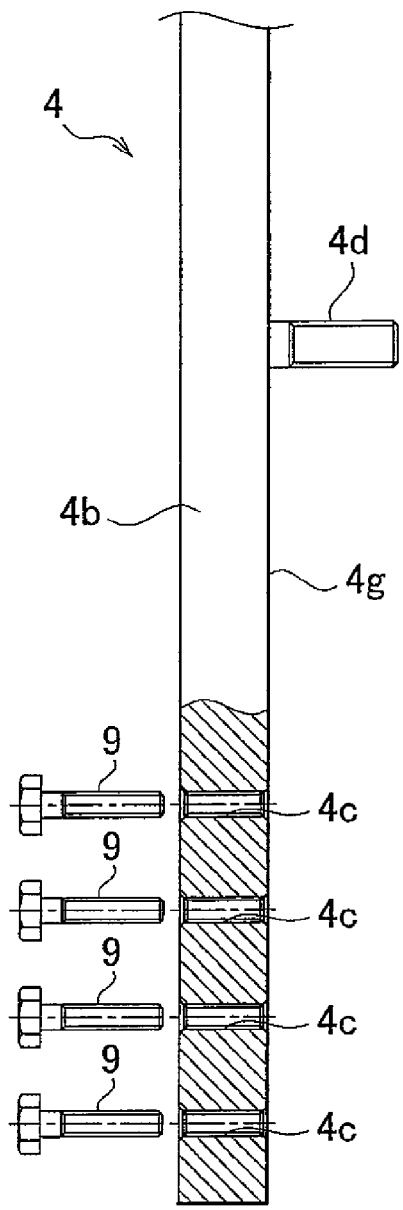

Next, the structure of the pawl portions 4 and 5 will be described in greater detail with reference to FIGS. 4 to 6. As shown in FIGS. 4 and 5A, the pawl portion 4 has the attaching surface 4g formed on the side to which the contact portion 6 attaches. Also, bolt holes 4c that are open to the attaching surface 4g are formed in the squeezing portion 4b of the pawl portion 4.

Figure 5B:
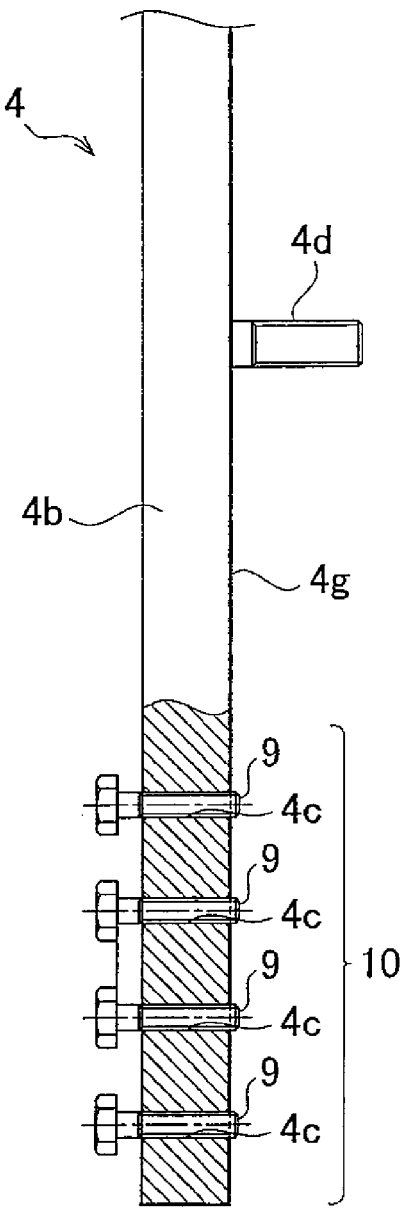

As shown in FIGS. 4 and 5B, bolts 9 are screwed into the bolt holes 4c. A retaining portion 10 is formed by the bolts 9 by screwing the bolts 9 in and adjusting them such that the tip ends of the bolts 9 protrude from the bolt holes 4c a predetermined amount from the attaching surface 4g. Also, bolts 4d that serve as portions for hanging the contact portion 6 protrude from the attaching surface 4g on the squeezing portions 4b. Incidentally, here, the structure of the squeezing portions 4b of the pawl portion 4 is described. However, a similar retaining portion 10, not shown, is also formed on the squeezing portion 5b of the pawl portion 5 by forming an arrangement surface, forming a plurality of open bolt holes in the arrangement surface, and screwing a plurality of bolts into these bolt holes.

The retaining portion 10 is a portion that has a concavo-convex shape formed on the attaching surface 4g that serves as a portion of the squeezing portion 4b on which the contact portion 6 is arranged. Incidentally, in this example embodiment, the retaining portion 10 that has a plurality of protruding portions (i.e., the tip ends of the plurality of bolts 9) scattered around the attaching surface 4g is given as an example, but the retaining portion of the grasping apparatus of the invention is not limited to this mode.

Figure 6A:
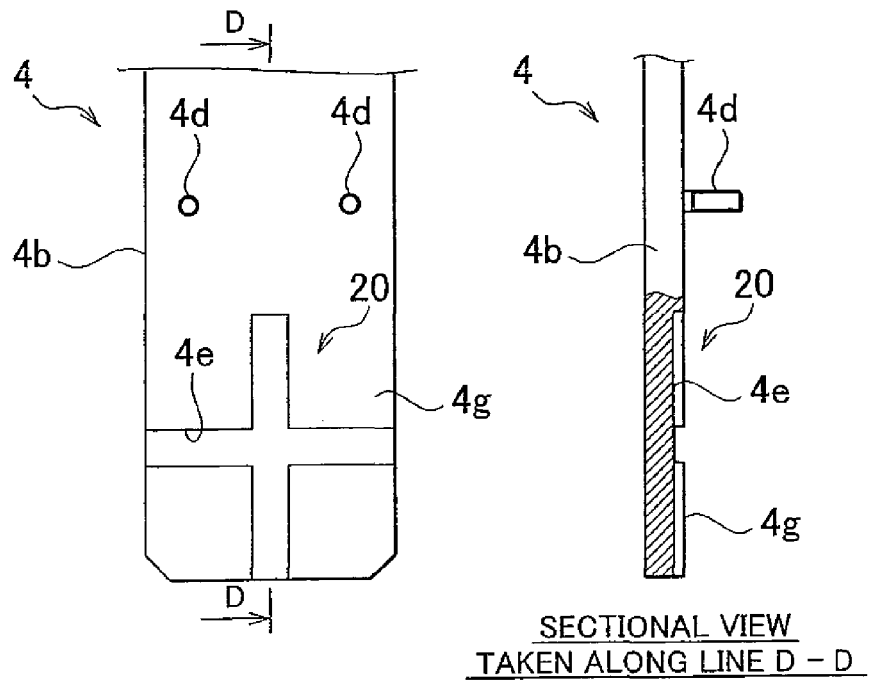
FIGS. 6A and 6B are partial views showing frame formats of retaining portions according to other example embodiments that are formed on the attaching surface of the pawl portion, with FIG. 6A being a front view of a retaining portion according to a second example embodiment of the invention and a sectional view taken along line D-D, and FIG. 6B being a front view of a retaining portion according to a third example embodiment of the invention and a sectional view taken along line E-E.
Figure 6B:
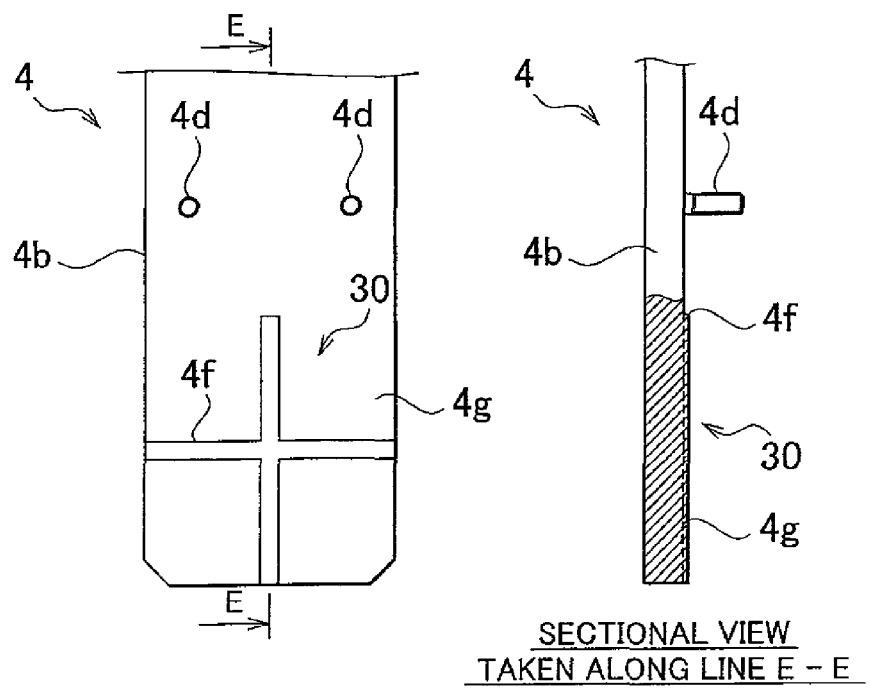

That is, other modes of the retaining portion are also possible. For example, a retaining portion 20 having a generally cross-shaped concave portion 4e formed in the attaching surface 4g, as shown in FIG. 6A, or a retaining portion 30 in which a generally cross-shaped convex portion 4f is formed on the attaching surface 4g, as shown in FIG. 6B, is also possible. That is, the retaining portion of the grasping apparatus of the invention can take on a variety of forms capable of limiting displacement of the contact portion 6 in two directions orthogonal to one another parallel to the attaching surface 4g. A retaining portion with a convex portion or a concave portion formed in a slanting direction with respect to the length direction and the width direction of the squeezing portions 4b, or with a plurality of protruding portions in a random arrangement is also possible.

Next, the structure of the contact portion 6 will be described in greater detail with reference to FIGS. 7 to 11. The pawl portions 4 and 5 are typically made of material of a predetermined hardness such as steel because it is necessary to ensure rigidity in order to achieve a predetermined squeezing force. As a result, when the pawl portions 4 and 5 directly contact the workpiece, the pawl portions 4 and 5 may damage the workpiece. Also, workpieces are made in a variety of shapes, so the shape of the portions of the pawl portions 4 and 5 that contact the workpiece must conform to the shape of the workpiece in order to achieve a stable grasping state. Therefore, the contact portions 6 are attached to the portions of the squeezing portions 4b and the squeezing portion 5b, i.e., the squeezing portions of the grasping portion 2, that contact the workpiece.

Figure 7:
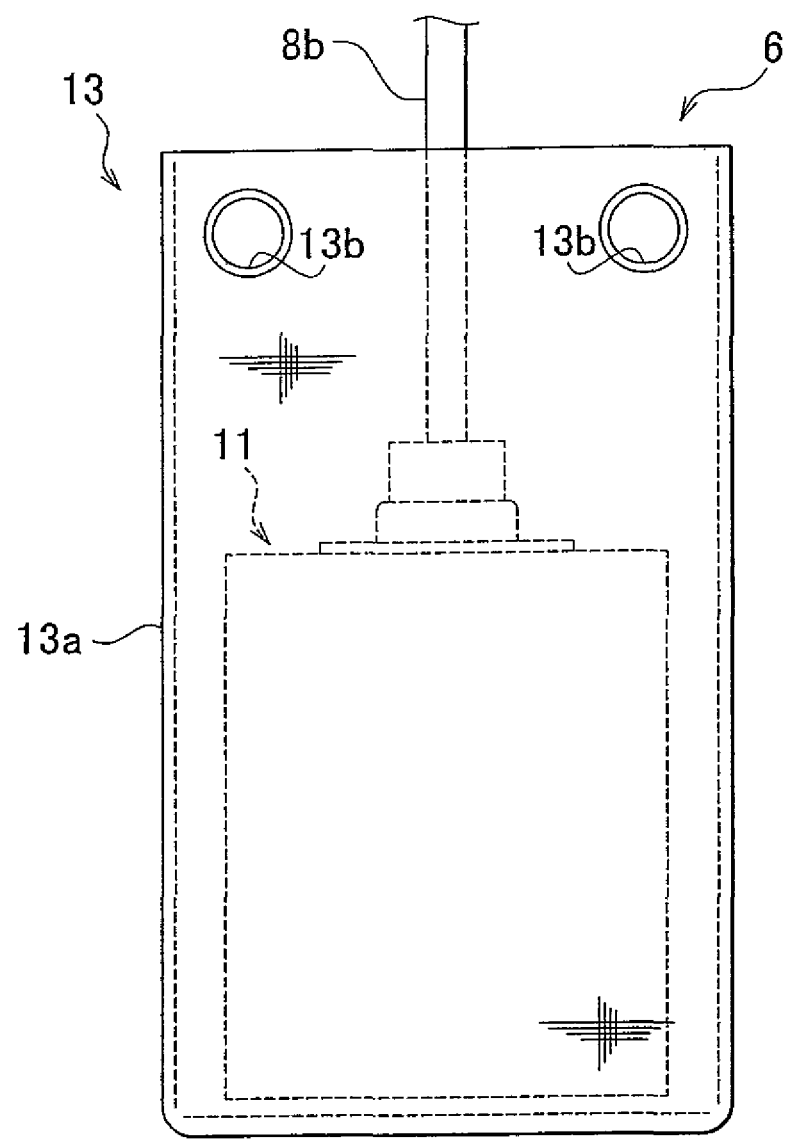
FIG. 7 is a view showing a frame format of a contact portion of the grasping apparatus according to the first example embodiment of the invention.

As described above, the contact portion 6 is a portion that is able take on two opposite forms, i.e., one in which the shape of the contact portion 6 is able to flexibly deform and another in which the shape of the contact portion 6 is firmly maintained, with a single member. This contact portion 6 is formed by an inner bag 11 and an outer bag 13 that covers the inner bag 11, and the like, as shown in FIG. 7.

Figure 8:
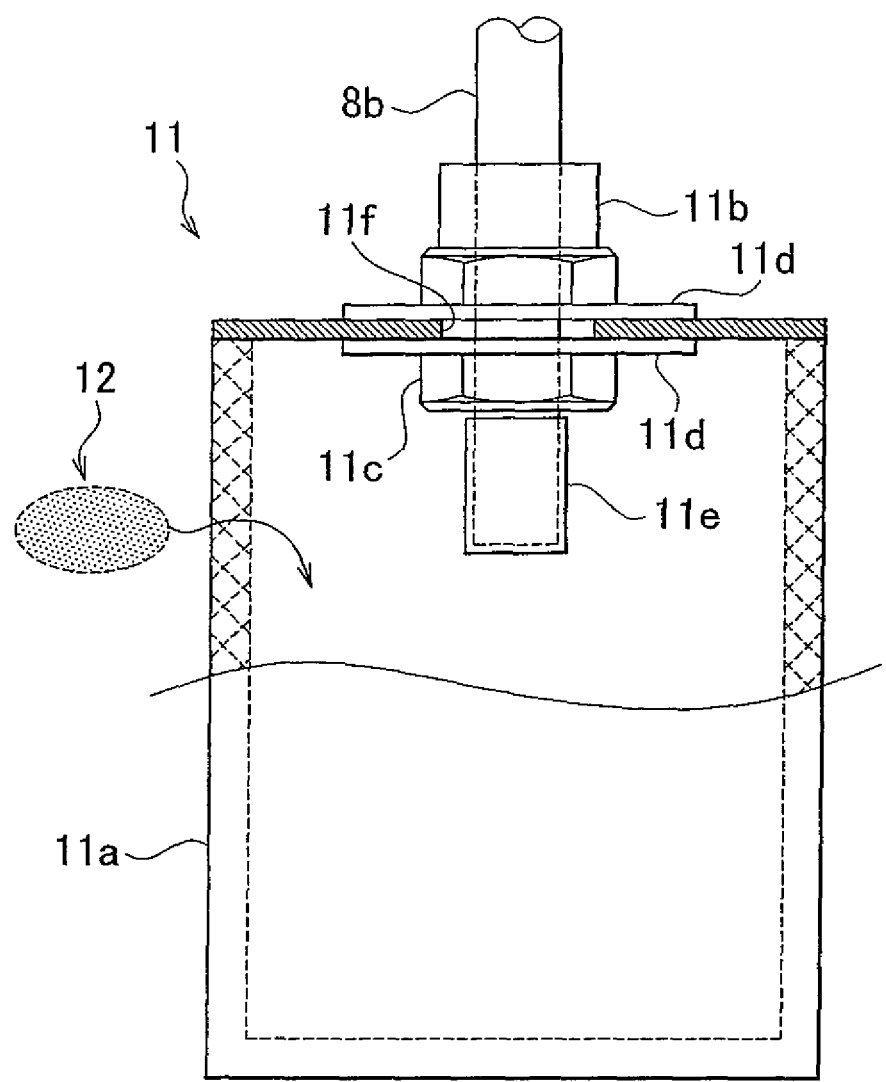
FIG. 8 is a view showing a frame format of an inner bag that forms part of the contact portion of the grasping apparatus according to the first example embodiment of the invention.

As shown in FIG. 8, the inner bag 11 is a member that is able take on two opposite forms, i.e., one in which the shape of the inner bag 11 is able to flexibly deform and another in which the shape of the inner bag 11 is firmly maintained, with a single member. This inner bag 11 includes a bag member 11a and a connecting port 11b and the like. The bag member 11a is a member made of nitrile rubber (NBR) that is elastic and airtight. The bag member 11a is formed in a bag shape by folding a generally rectangular sheet made of NBR in half and vulcanize-bonding the mating surfaces of the three peripheral sides except for the side that is folded over. Also, a hole portion 11f is formed in generally the center portion of the folded side of the bag member 11a, and the connecting port 11b that serves as a member for communicating the inside of the bag member 11a with the outside of the bag member 11a is arranged in the hole portion 11f. The connecting port 11b is attached to the hole portion 11f while ensuring that the hole portion 11f is airtight by inserting seal members 11d and fastening them by screwing on nuts 11c. Also, the vacuum duct 8b is connected to the connecting port 11b, and a filter 11e is arranged at an end portion of the connecting port 11b that is inside the bag member 11a.

Then the granular substance 12 is filled into the bag member 11a. Also, the inner bag 11 is configured to prevent the granular substance 12 from coming out of the connecting port 11b by the filter 11e.

Incidentally, in this example embodiment, a case is described in which nitrile rubber (NBR) is used as the material of the inner bag 11 (i.e., the bag member 11a). However, the material of which the inner bag 11 is made is not limited to this. As long as the material is elastic and airtight, any of a variety of materials may be used according to conditions such as the operating environment and the like.

Figure 9:
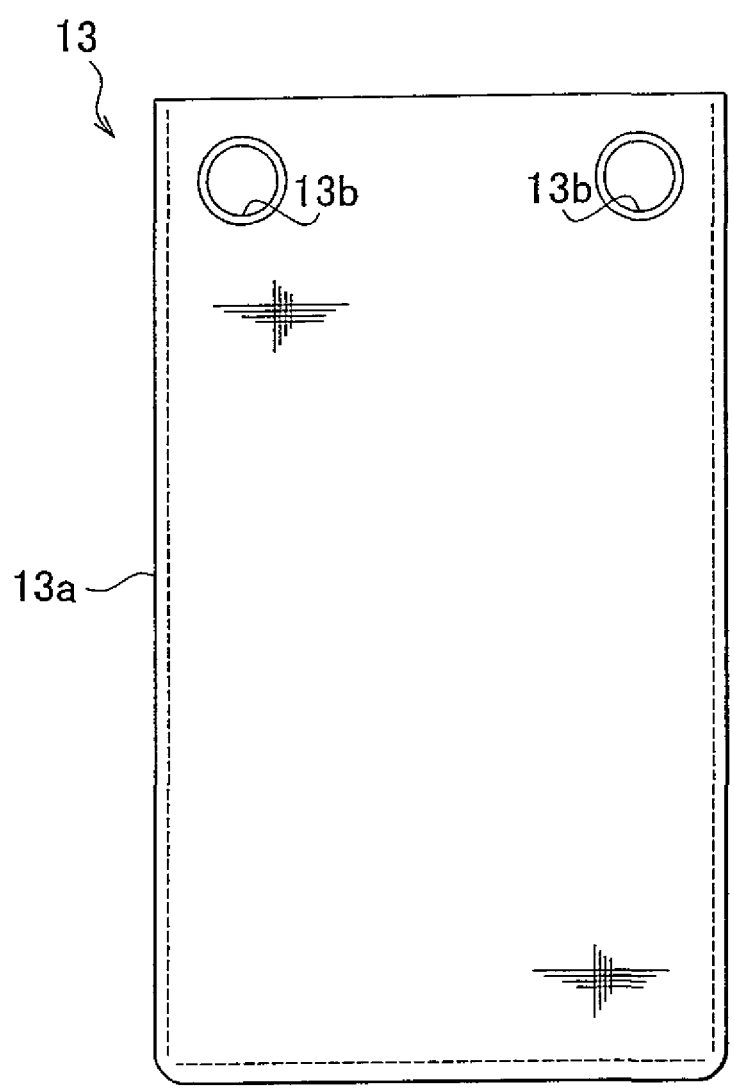
FIG. 9 is a view showing a frame format of an outer bag that forms part of the contact portion of the grasping apparatus according to the first example embodiment of the invention.

As shown in FIG. 9, the outer bag 13 is a member for covering and protecting the inner bag 11, and includes a bag body 13a and anchoring portions 13b and the like. The bag body 13a is a member made of aramid fiber that is resistant to abrasion and cutting. The bag body 13a is formed in a bag shape by overlapping two generally rectangular sheets of aramid fiber material and sewing them together on three sides. The size of the inside of the bag body 13a is large enough to be able to displaceably house the inner bag 11. Also, the anchoring portions 13b and the like that serve as portions for hanging the outer bag 13 are attached at an area near the open side where the bag body 13a is not sewn. In this example embodiment, a simple structure that employs metal grommets for the anchoring portions 13b is used.

In this example embodiment, aramid fiber is used as the material of the outer bag 13 (i.e., the bag body 13a). Aramid fiber is material that has extremely good resistance to abrasion and cutting, so it is able to reliably protect the inner bag 11 against abrasion and cutting. Also, aramid fiber is flexible enough to conform to the shape of the workpiece, so the inner bag 11 that is housed in the outer bag 13 is able to accurately conform to the shape of the workpiece that it contacts via the outer bag 13. Therefore, aramid fiber is suitable as material for forming the outer bag 13 (i.e., the bag body 13a). At this time, aramid fiber of an appropriate form may be used, whether it be woven, knit, or nonwoven, etc. However, in order to obtain both sufficient flexibility and durability, woven aramid fiber is preferably used. Incidentally, in this example embodiment, a case is described in which aramid fiber is used as the material of the outer bag 13. However, the material of which the outer bag 13 is made is not limited to this. Any of a variety of materials may be used as long as it has excellent resistance to abrasion and cutting, and is flexible enough to conform to the shape of the workpiece.

That is, the contact portion 6 is formed with the inner bag 11 housed inside the outer bag 13, as shown in FIG. 7. This configuration makes it possible to simply and reliably inhibit the inner bag 11 from wearing due to repeated use, or from being cut by cutting dust or the like that has adhered to the workpiece. As a result, the product life of the inner bag 11 can be extended.

Also, the contact portion 6 is such that the inner bag 11 and the outer bag 13 are formed of separate bodies, and the inner bag 11 and the outer bag 13 are able to be displaced relative to each other. As a result, deformation of the inner bag 11 will not be cramped or impeded by the outer bag 13. Therefore, the inner bag 11 is able to accurately conform to the shape of the workpiece via the outer bag 13, so the contact portion 6 is able to accurately conform to the shape (i.e., the concavo-convex portion) of the workpiece. That is, having the inner bag 11 and the outer bag 13 be separate bodies enables a more firm grasping state to be achieved with the contact portion 6, compared with a contact portion that has a bag body with a double-layered structure in which the inner bag and the outer bag are integrated. Furthermore, with the contact portion 6, it is possible to replace only the inner bag 11 if the inner bag 11 becomes damaged, or replace only the outer bag 13 if the outer bag 13 becomes damaged. As a result, the contact portion 6 is also very economical.

Figure 10:
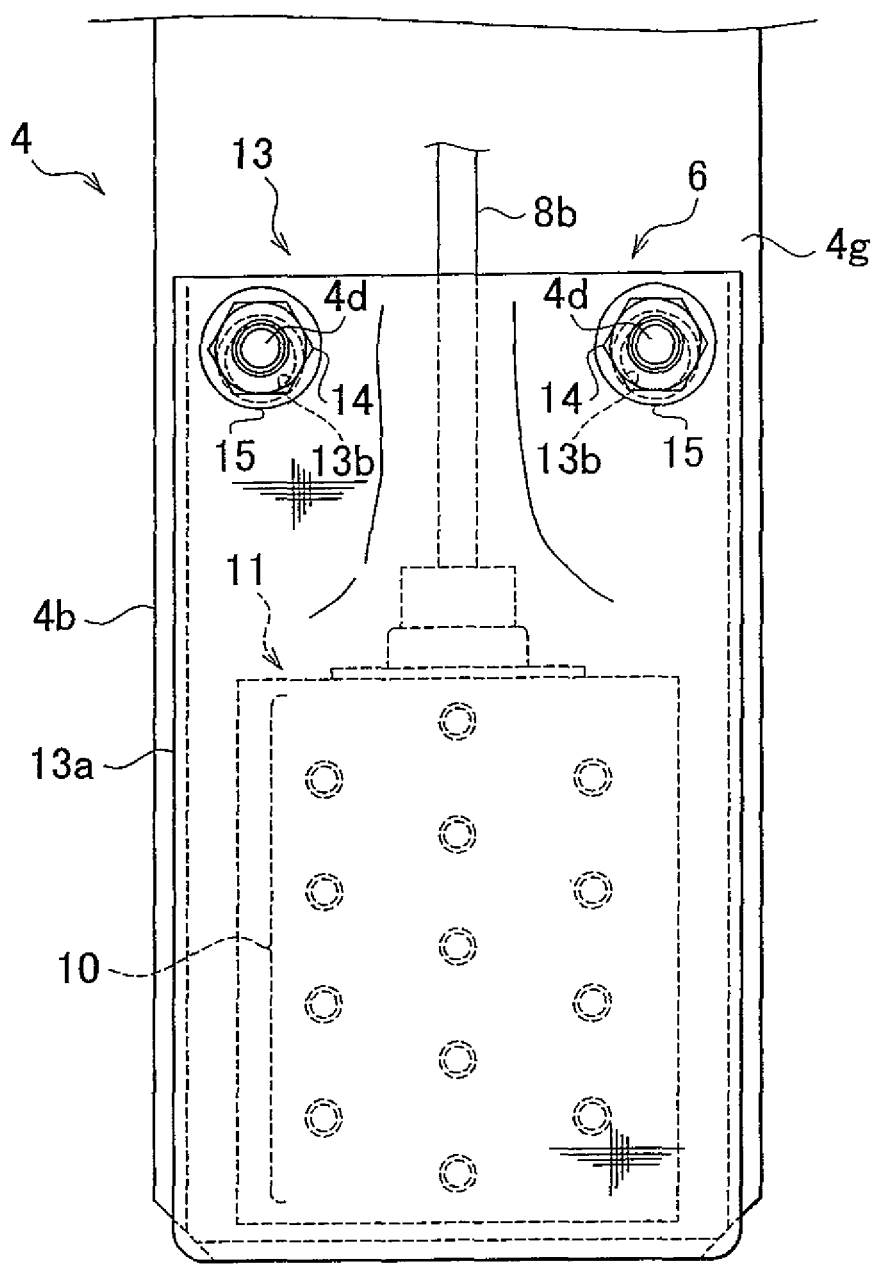
FIG. 10 is a partial front view showing a frame format of the contact portion attached to the squeezing portion.
Figure 11:
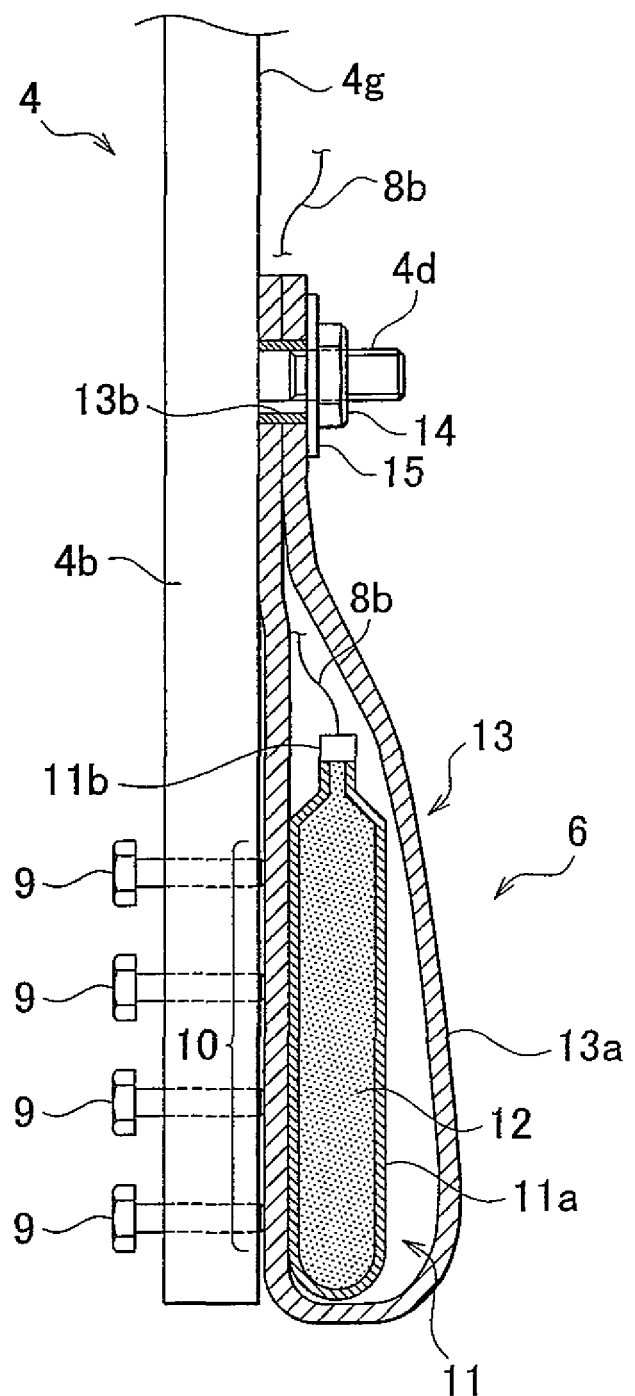
FIG. 11 is a partial side sectional view showing a frame format of the contact portion attached to the squeezing portion.

As shown in FIGS. 10 and 11, the contact portion 6 hangs by the anchoring portions 13b of the outer bag 13 from the bolts 4d of the squeezing portions 4b. Then nuts 14 are fastened via washers 15 onto the bolts 4d while the contact portion 6 (i.e., the outer bag 13) is hanging from the anchoring portions 13b, so the contact portion 6 is easily and reliably attached to the squeezing portions 4b. With this kind of structure, the contact portion 6 is easily replaced. Therefore, the contact portion 6 can be easily introduced into an actual production line where abrasion and cutting is anticipated.

Also, the contact portion 6 that is attached in this way contacts the retaining portion 10 on the surface on the side that contacts the attaching surface 4g.

Incidentally, here a case is described in which the contact portion 6 is attached to the squeezing portions 4b of the pawl portion 4. However, bolts also protrude on the squeezing portion 5b of the pawl portion 5 as well, and the contact portion 6, not shown, is similarly attached here by being hung on these bolts and fixed in place using nuts and washers and the like.

Incidentally, in this example embodiment, the contact portions 6 are attached to the squeezing portions 4b and 5b using the nuts and bolts and the like. However, the invention is not limited by the mode by which the contact portions 6 are attached to the squeezing portions 4b and 5b. For example, the contact portions 6 may be attached using resin bands, or the contact portions 6 may be fixed so as to be able to detach easily by one-touch clasps. That is, any of a variety of attaching methods may be used as long as the contact portions 6 are able to be attached to the retaining portions 10, and the contact portions 6 can easily be detached without falling off of the squeezing portions 4b and 5b.

Next, the method for selecting the granular substance 12 that makes up part of the contact portion 6 will be described with reference to FIGS. 12A and 12B. The granular substance 12 is filled inside the contact portion 6 (i.e., more specifically, the bag member 11a). The bag member 11a and the granular substance 12 are hardened in a suitable shape in an integrated state by reducing the pressure inside the bag member 11a such that the grains that form the granular substance 12 are held firmly together.

The contact portion 6 preferably has properties such as 1) having good hardness when hardened, and 2) being lightweight, but the hardness of the contact portion 6 when hardened and the weight of the contact portion 6 change according to various changes in the specifications of the granular substance 12. Therefore, in this example embodiment, the hardness when hardened with granular substances of various specifications was measured using a test apparatus such as that shown in FIG. 12A, and the granular substance to be filled into the contact portion 6 was selected base on the measurement results.

Figure 12A:
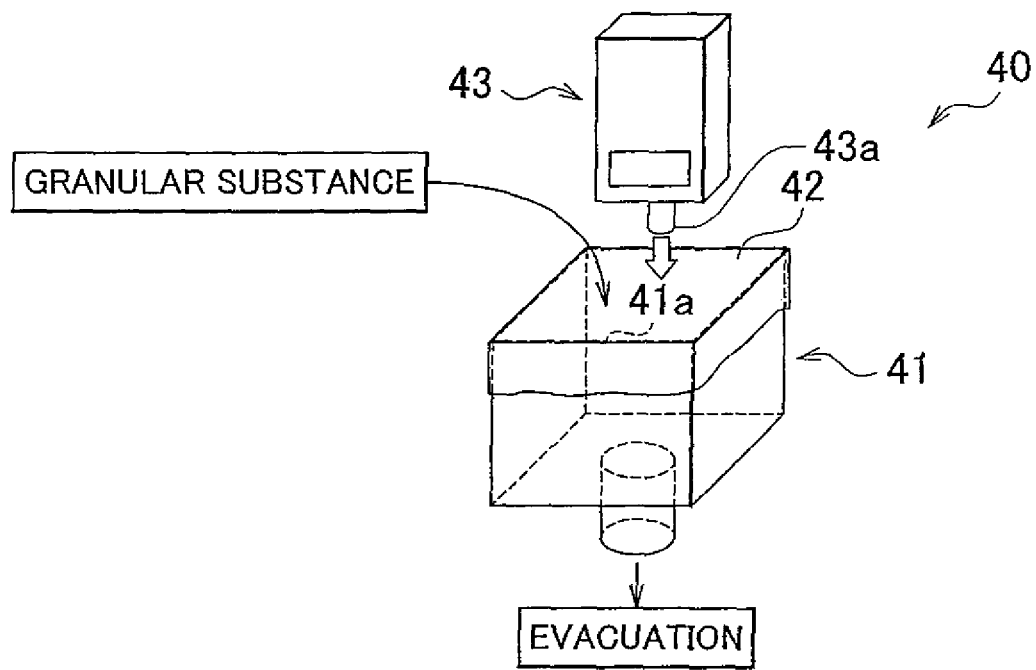

As shown in FIG. 12A, a test apparatus 40 includes a case 41 for filling the granular substance, an elastic membrane member 42 that seals an open portion of the case 41, and a push-pull gauge 43 for measuring the hardness when hardened, and the like. Incidentally, in this example embodiment, a plastic container with a volume of approximately 20×20×15 mm was used as the case 41, and a resin sheet was used as the membrane member 42. Also, the push-pull gauge 43 that was used has a pushing portion 43a with a diameter of 6 mm (the pushing area is approximately 28.3 mm$^2$).

The test procedure with the test apparatus 40 will now be described. First, the case 41 was filled with a granular substance, and then an open portion 41a of the case 41 was sealed with the membrane member 42. Next, the inside of the case 41 was evacuated such that the granular substance inside the case 41 hardened. Then the push-pull gauge 43 was pushed against the hardened granular substance via the membrane member 42 and the compression force was measured. Also, the peak value of the measured compression force at that time was recorded as the hardness index. Incidentally, in this test, the hardness of the each type of granular substance was evaluated after measuring the peak value for each type of granular substance three times.

FIG. 12B is a chart of the measurement results after measuring the hardness of each type of granular substance with the test apparatus 40. In FIG. 12B, the measurement results for 20 typical types of granular substances, from among those selected, are shown. Incidentally, the hardness column shows the minimum to maximum values of the three measurement results.

From the test results shown in FIG. 12B, it is determined that seven types of granular substances, i.e., salt (No. 3), the metal powders (Nos. 4 to 7), ceramic fragments (large) (No. 18), and abrasive grain (GF24) (No. 20), have good hardness in which all three hardness measurement values exceeded 10 kgf.

However, it is also desirable that the granular substance filled in the contact portion 6 be lightweight, so of the types with the top seven hardness measurement results, the metal powders and the abrasive grain, which are iron or the like and have a large specific gravity, were eliminated as selection candidates. This left the salt and the ceramic fragments (large) as selection candidates.

Here, salt is problematic that it becomes hard when it contains moisture and may cause rusting if it were ever to leak out, for example. Therefore, taking into account the stability of the chemical property and the shape, it was ultimately determined that the ceramic fragments (large) (No. 18) were the best suited for the granular substance to be filled into the contact portion 6, so they were selected.

The ceramic fragments (large) form a granular substance in which the grains that are formed of artificial ceramic (so-called synthetic mullite) including at least $Al_2O_3$ and $SiO_2$, that has been crushed such that the average grain diameter is approximately 0.4 to 0.5 mm, inclusive, are shaped with edge portions. These ceramic fragments (large) are suitable for the granular substance in view of their hardness, the stability of the chemical property, and light weight (i.e., small specific gravity).

Incidentally, the following can be considered from the test results shown in the chart in FIG. 12B. When looking at the granular substances with low hardness measurement results, it is evident that the shape of the grains forming each of these granular substances is generally spherical. That is, it is difficult to obtain good hardness of the granular substance that is filled into the contact portion 6 if the shape of the grains that form that granular substance is generally spherical. Here, it is thought that the reason why the contact portion 6 becomes hard when the pressure is reduced is because adjacent grains that are in contact with one another more firmly anchor one another, so grains that are generally spherical with no edge portions or flat surfaces will anchor one another less firmly. Incidentally, the term generally spherically here refers to a shape in which there are no edge portions or flat portions, or concavo-convex portions that are able to lock together with other grains or the like, on the outside. This term does not necessarily mean completely spherical, but is a concept that also includes shapes such as elliptic spheres and barrel shapes.

Because of this as well, it can be determined that it is preferable to select a granular substance to be filled into the contact portion 6, in which the shape of the grains that make up the granular substance is other than generally spherical, and has edge portions and flat portions.

Figure 13A:
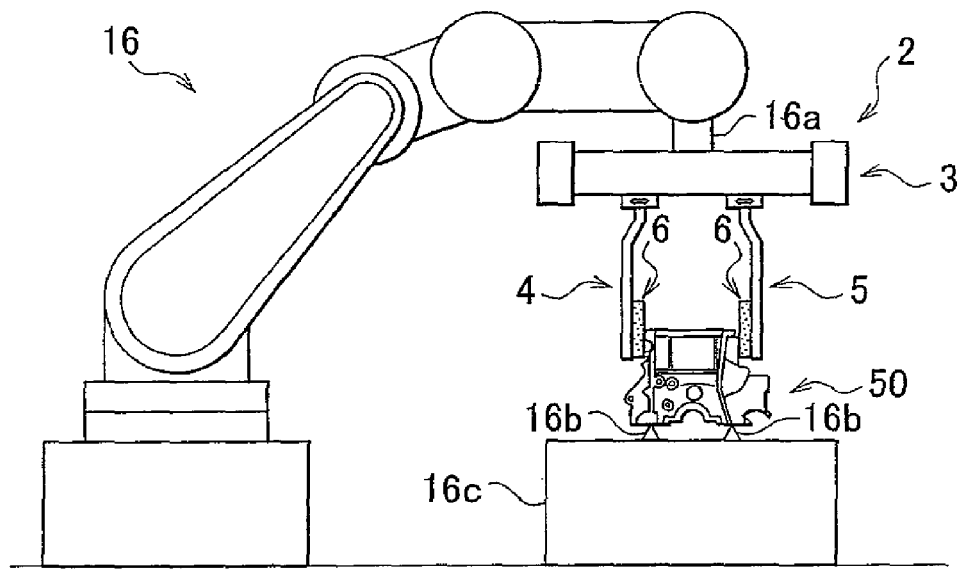
FIGS. 13A and 13B are views showing frame formats of a transport apparatus provided with the grasping apparatus of the invention, with FIG. 13A being a view of the overall structure of the transport apparatus, and FIG. 13B being a view of a state in which an apparatus is connected to the grasping apparatus of the transport apparatus.

Next, a case in which the workpiece is conveyed using the grasping apparatus 1 according to the first example embodiment of the invention will be described with reference to FIGS. 13 to 17. As shown in FIG. 13A, in this example embodiment, the grasping portion 2 of the grasping apparatus 1 is arranged on a tip portion 16a of a robotic arm 16. The grasping portion 2 grasps the workpiece 50, and the robotic arm 16 transports the workpiece 50. The workpiece 50 is placed in a predetermined position on a workpiece placement portion 16c, positioned by positioning portions 16b formed by positioning pins or the like, for example.

Figure 13B:
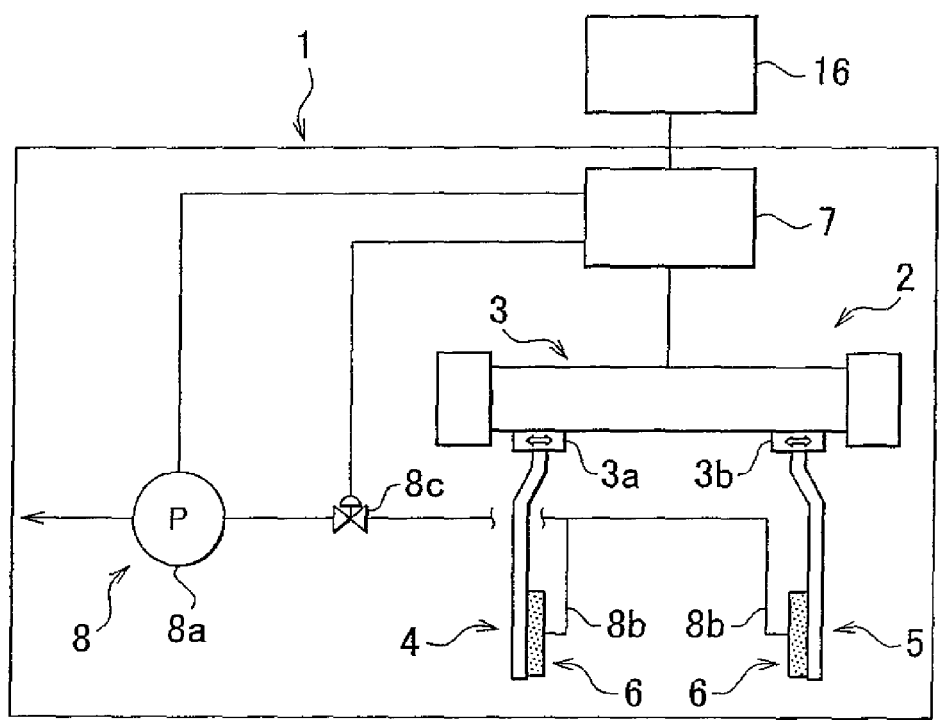

As shown in FIG. 13B, the control device 7 of the grasping apparatus 1 is connected to the robotic arm 16, and information such as the placement and angle and the like of the tip portion 16a of the robotic arm 16 is input to the control device 7.

Figure 14A:
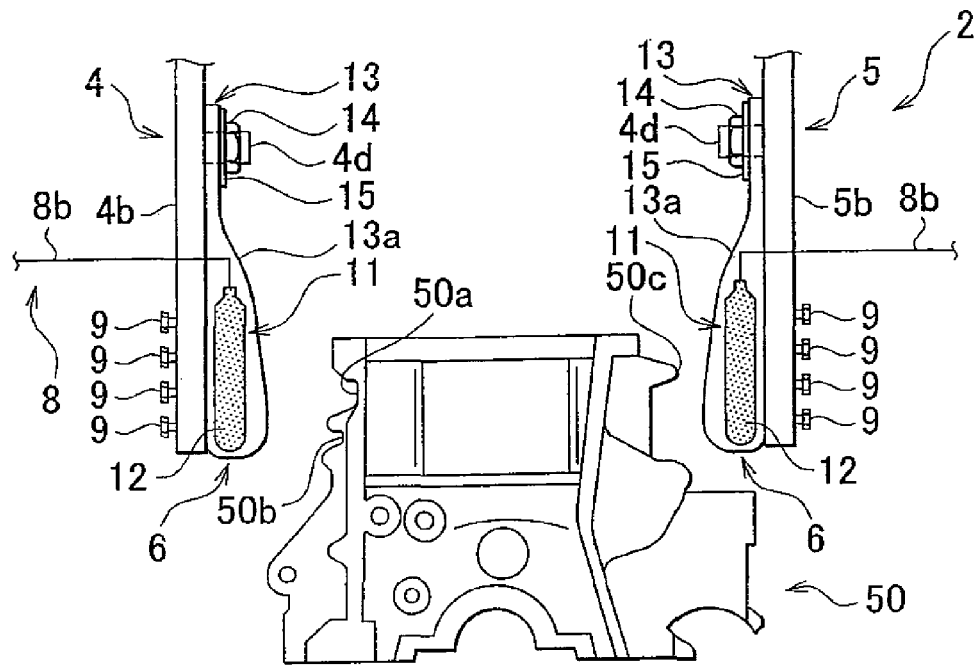
FIGS. 14A and 14B are views showing frame formats of a scenario in which a workpiece is grasped by the grasping apparatus, with FIG. 14A being a view of a state before the workpiece is grasped, and FIG. 14B being a view showing a state in which the workpiece is being grasped (before evacuation)

As shown in FIGS. 13A, 13B, and 14A, the robotic arm 16 places the grasping portion 2 in a predetermined position with respect to the workpiece 50 by adjusting the placement and angle and the like of the tip portion 16a. Then, a signal indicating that the grasping portion 2 has been placed in the predetermined position with respect to the workpiece 50 is input to the control device 7 from the robotic arm 16. At this time, the control device 7 places the grasping portion 2 such that the workpiece 50 is arranged between the pawl portions 4 and 5, and concavo-convex portions 50a, 50b, and 50c that are portions of the workpiece 50 that are suitable to be grasped are arranged in positions facing the contact portions 6.

Figure 14B:
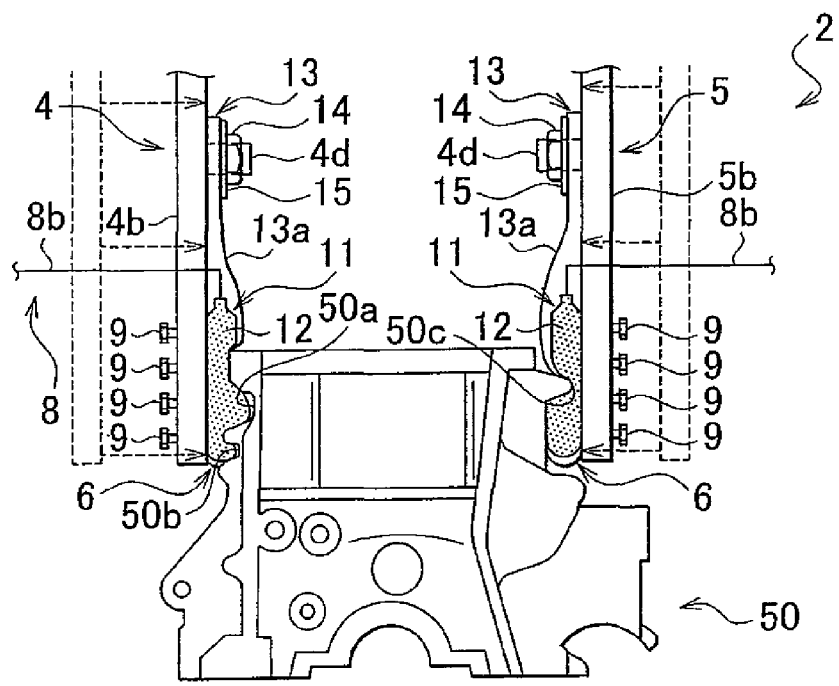

Next, the control device 7 adjusts the distance between the pawl portions 4 and 5 to be equal to or less than the width of the workpiece 50 by adjusting the stroke of the slider portions 3a and 3b, as shown in FIGS. 13B and 14B. Then the pawl portions 4 and 5 grasp the workpiece 50 with a predetermined squeezing pressure.

Figure 15:
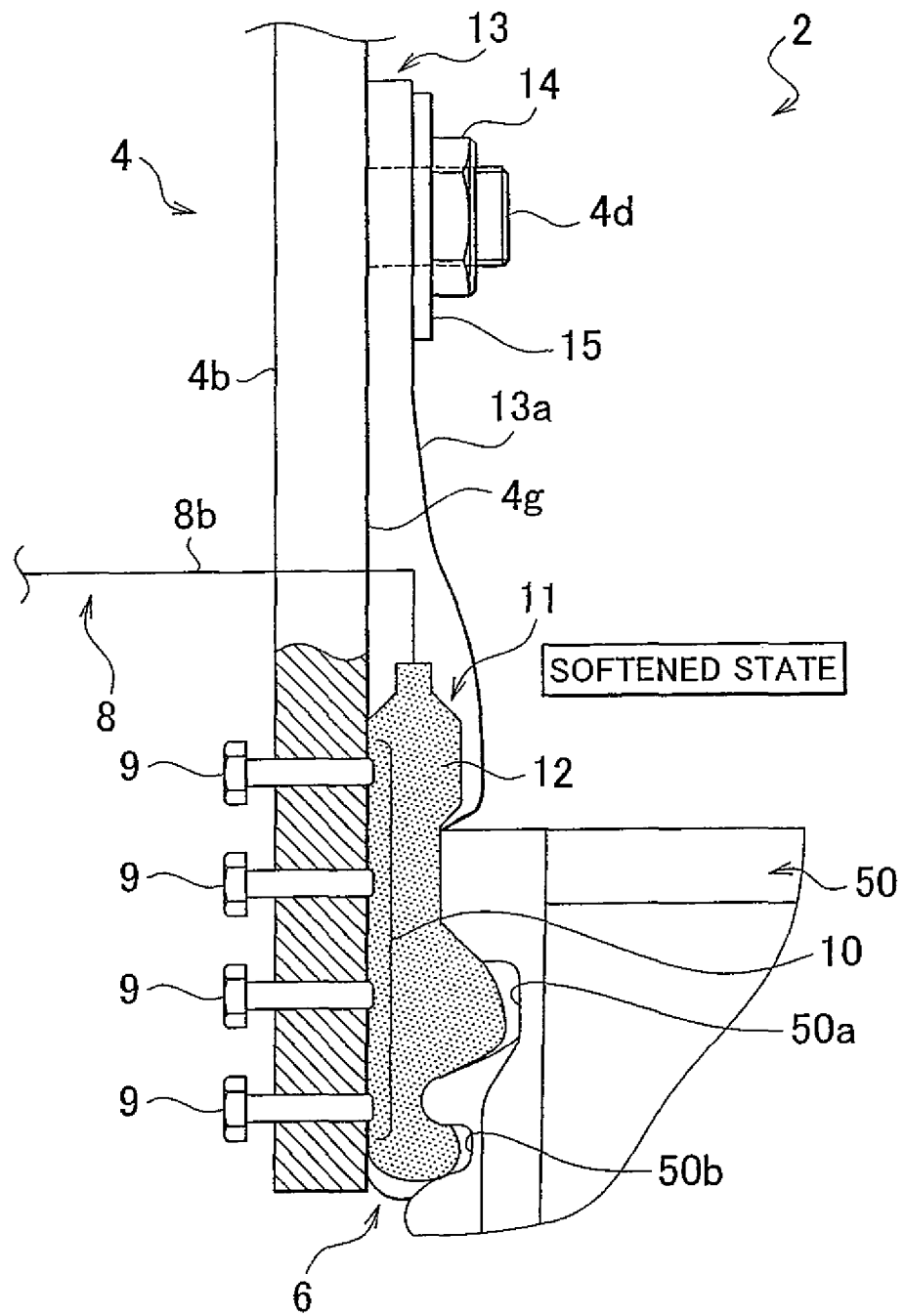
FIG. 15 is a side sectional view showing a frame format of a deformed state of the contact portion when the workpiece is being grasped by the grasping apparatus.

As shown in FIG. 15, at this time, the contact portions 6 are pressed against the concavo-convex portions 50a and 50b of the workpiece 50 and deform following the shapes of the concavo-convex portions 50a and 50b. Also at this time, the contact portions 6 are also pressed on the attaching surface 4g side, and thus also deform following the shape of the retaining portions 10 (i.e., the tip end portions of the bolts 9) formed on the attaching surfaces 4g.

Here, each contact portion 6 is such that the inner bag 11 is housed inside the outer bag 13 made of aramid fiber, and the inner bag 11 and the outer bag 13 are able to deform relative to one another. Therefore, the outer bag 13 will not impede the deformation of the inner bag 11. As a result, with the grasping portion 2, the contact portions 6 are able to reliably conform to the shapes of retaining portions 10 and the concavo-convex portions 50a, 50b, and 50c of the workpiece 50.

Figure 16A:
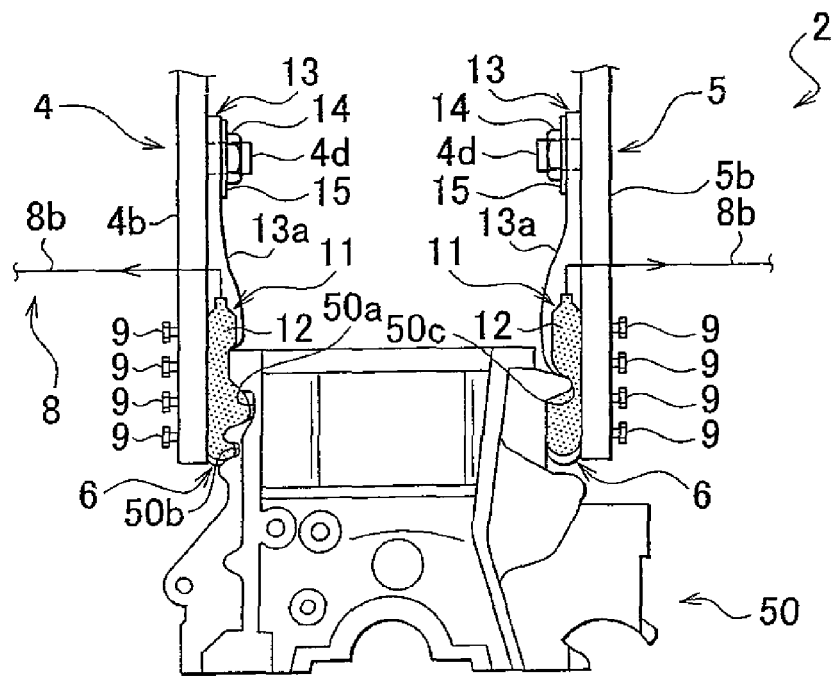
FIGS. 16A and 16B are views showing frame formats of a scenario in which the workpiece is grasped by the grasping apparatus, with FIG. 16A being a view of a state in which the workpiece is being grasped (after evacuation), and FIG. 16B being a view of a state in which the grasp on the workpiece has been released (after the vacuum is broken)

Next, while the pawl portions 4 and 5 are squeezing the workpiece 50 at the predetermined squeezing pressure, a command signal is output from the control device 7 to the vacuum pump 8a to evacuate the inside of the inner bags 11 of the contact portions 6, as shown in FIGS. 13B and 16A.

Figure 17:
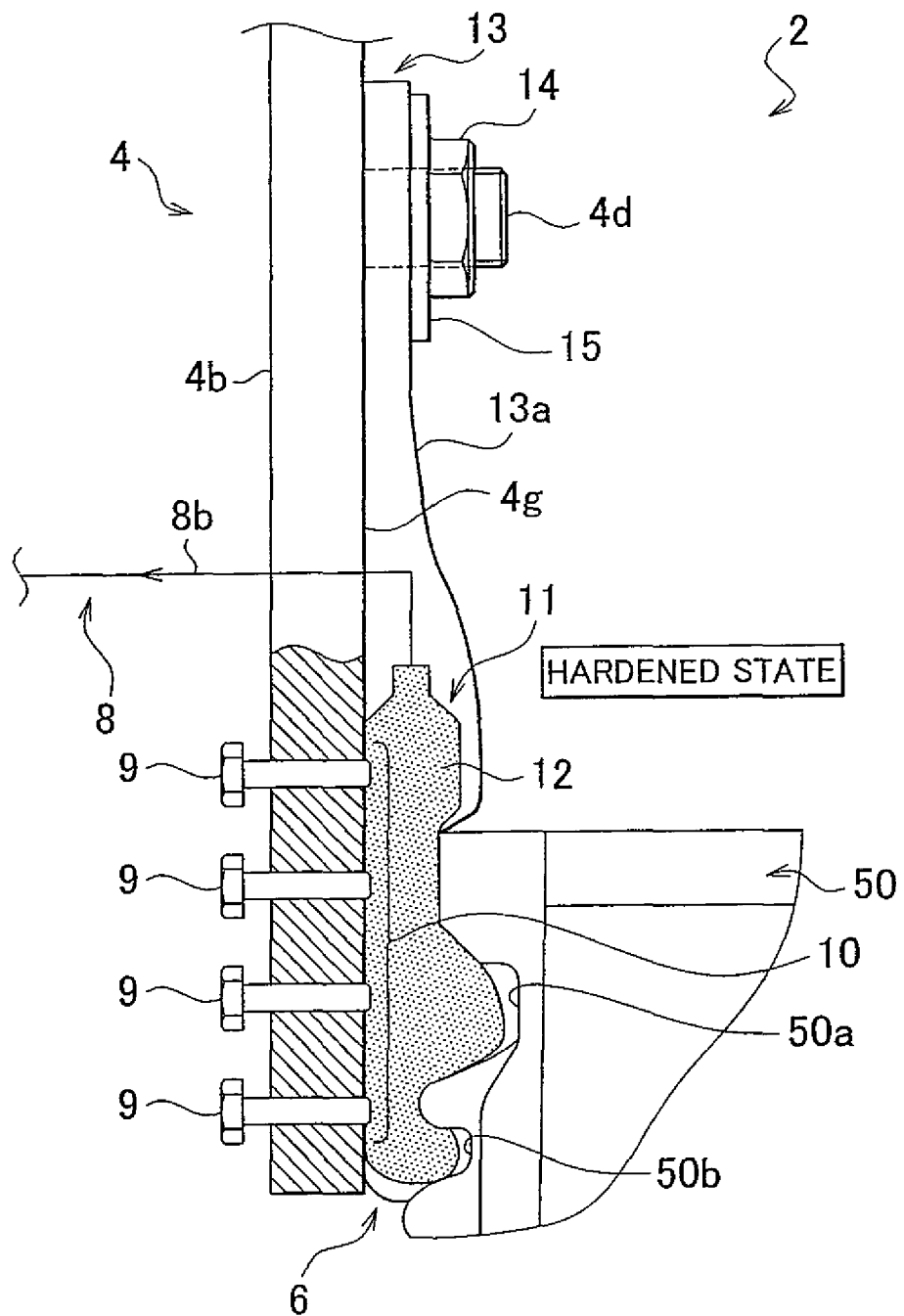
FIG. 17 is a side sectional view showing a frame format of a state in which the contact portion is retained by the retaining portion when the workpiece is being grasped by the grasping apparatus.

As shown in FIG. 17, at this time, the contact portions 6 harden in a state conformed to the shape of the concavo-convex portions 50a and 50b of the workpiece 50. Also at this time, the contact portions 6 harden in a state conforming to the shape of the retaining portion 10. Incidentally, the retaining portions 10 are able to adjust the retaining force (i.e., the friction force) with respect to the contact portions 6 by adjusting the amount that the bolts 9 protrude from the attaching surfaces 4g.

Here, with the contact portions 6, the granular substance 12, i.e., the ceramic fragments (i.e., the ceramic fragments (large) (No. 18) in FIG. 12B), is filled into the inner bags 11, so shapes conforming to the retaining portions 10 and the concavo-convex portions 50a and 50b, and 50c of the workpiece 50 are able to be reliably maintained at a sufficient hardness. Therefore, the contact portions 6 will not be displaced with respect to the workpiece 50, and are retained by the retaining portions 10 and thus will not be displaced with respect to the squeezing portions 4b either, so a firm grasping state can be created by the grasping portion 2. As a result, when transporting the workpiece 50, the workpiece 50 can be reliably inhibited from being displaced with respect to the pawl portions 4 and 5, so the workpiece 50 can be transported while ensuring positioning accuracy.

If the contact portions 6 become displaced with respect to the workpiece 50 or the squeezing portions 4b, the workpiece 50 that has been positioned by the positioning pins (i.e., positioning pins 16b) may be damaged by the positioning pins when the workpiece 50 is grasped and lifted up. However, the grasping portion 2 is able to grasp the workpiece 50 while accurately maintaining the positional relationship between the workpiece 50 and the pawl portions 4 and 5, so the workpiece 50 will not be damaged by the positioning pins, and the positioning accuracy after transport can be precisely ensured.

That is, the grasping apparatus 1 according to the first example embodiment of the invention includes the grasping portion 2 for grasping the workpiece 50. The grasping portion 2 includes the pawl portions 4 and 5 that have the plurality of squeezing portion 4b and 5b that squeeze the workpiece 50, and the contact portions 6. Each of the contact portions 6 includes the inner bag 11 that is a bag member made of elastic material, and the granular substance 12 that is filled into the inner bag 11. The contact portions 6 are attached to portions of the squeezing portions 4b and 5b that contact the workpiece 50. The contact portions 6 harden the granular substance 12 while keeping it in an appropriate shape (e.g., conforming to the concavo-convex portions 50a, 50b, and 50c of the workpiece 50), by reducing the pressure inside the inner bags 11 to increase the volume ratio of the granular substance 12 to the inner volume of the inner bags 11. The retaining portions 10 that have concavo-convex shapes are formed on the attaching surfaces 4g that are portions of the squeezing portions 4b and 5b that the contact portions 6 attach to. According to this kind of structure, the contact portions 6 are inhibited from being displaced with respect to the squeezing portions 4b and 5b when the grasping portion 2 grasps the workpiece 50.

Also, in the grasping apparatus 1 according to the first example embodiment of the invention, each of the contact portions 6 has the outer bag 13 that covers the inner bag 11 and is made of aramid fiber. This kind of structure makes it possible to inhibit the contact portions 6 from being displaced with respect to the squeezing portions 4b and 5b while ensuring the resistance to abrasion and cutting of the contact portions 6.

Also, in the grasping apparatus 1 according to the first example embodiment of the invention, the inner bag 11 is housed inside the outer bag 13 in a state relatively displaceable with respect to the outer bag 13. This kind of structure enables the inner bag 11 to accurately conform to the shape of the retaining portion 10, and thus makes it possible to more reliably inhibit the contact portions 6 from being displaced with respect to the squeezing portions 4b and 5b.

Further, in the grasping apparatus 1 according to the first example embodiment of the invention, the granular substance 12 is formed by ceramic fragments (i.e., the ceramic fragments (large) (No. 18) in FIG. 12B) in which the shape of the grains that make up the granular substance 12 is a shape other than generally spherical. This kind of structure enables the contact portions 6 to be even harder when hardened, and thus makes it possible to more reliably inhibit the contact portions 6 from being displaced with respect to the squeezing portions 4b and 5b.

Figure 16B:
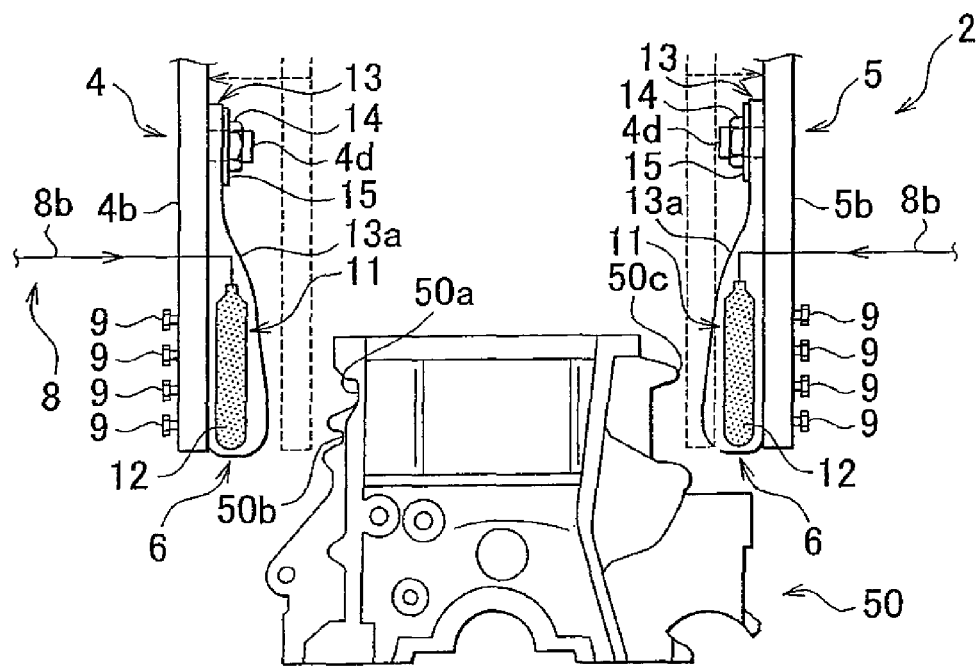

Also, after transporting the workpiece 50 to a predetermined position using the robotic arm 16, the control device 7 adjusts the distance between the $_p$awl portions 4 and 5 so that it is greater than the width of the workpiece 50 by adjusting the stroke of the slider portions 3a and 3b, as shown in FIG. 16B. Then, the workpiece 50 is released from being grasped by the pawl portions 4 and 5.

When handling a workpiece having a shape different than that of the workpiece 50, the control device 7 outputs a command signal to the electromagnetic valve 8c to open the electromagnetic valve 8c, thus breaking the vacuum state in the contact portions 6 so that the contact portions 6 can return to their normal state. As a result, it is possible to flexibly handle a plurality of various workpieces having various shapes, with the grasping apparatus 1 that has a single grasping portion 2. Therefore, the trouble and the like related to changing the contact portions 6 so that they correspond to the shape of the workpiece each time the type of workpiece changes is eliminated, so productivity can be improved.

Further, when handling a workpiece having the same shape as the workpiece 50, after the bag member 11a has finished being evacuated, command signals are output from the control device 7 to the vacuum pump 8a and the electromagnetic valve 8c to stop the vacuum pump 8a and close the electromagnetic valve 8c. As a result, the reduced-pressure state inside the bag member 11a is maintained, enabling the contact portions 6 to easily be kept in the hardened state.

Therefore, even after the pawl portions 4 and 5 have released the grasp on the workpiece 50, the contact portions 6 can be kept in the hardened state in a form suitable for grasping the workpiece 50 as long as the reduced-pressure state in the bag member 11a is maintained. Accordingly, when transporting a plurality of the workpieces 50 in succession, the workpieces 50 can be reliably grasped and transported while ensuring positioning accuracy, by the contact portions 6 that are in a form suitable for grasping the workpiece 50.

Incidentally, in this example embodiment, a case is described in which the grasping apparatus 1 is applied to a transport apparatus, but the use of the grasping apparatus 1 is not limited to this. For example, the grasping apparatus 1 may also be used as a tool for temporarily fixing a workpiece during the assembly of a product, or as a tool for stably holding a workpiece having an unstable shape for storage or the like.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A grasping apparatus comprising:
a grasping portion for grasping a workpiece, the grasping portion including i) pawl portions having a plurality of squeezing portions that squeeze the workpiece, and ii) contact portions, each of which has a bag member made of elastic material, and a granular substance that is filled in the bag member, the contact portions being attached to portions of the squeezing portions that contact the workpiece, and hardening the granular substance while keeping the granular substance in an appropriate shape by increasing a volume ratio of the granular substance to an inner volume of the bag member,
wherein a retaining portion that has a concave or convex shape is formed at a portion of each of the pawl portions, to which the corresponding contact portion attaches; and the pawl portions squeeze the workpiece, the contact portions are pressed against the workpiece, and the granular substance is hardened in a state where the contact portions are deformed following the workpiece and the retaining portions, thereby hardening the contact portions in a state conformed to the workpiece and the retaining portions to grasp the workpiece.

2. The grasping apparatus according to claim 1, wherein each of the contact portions includes an outer bag that is made of aramid fiber and that covers the bag member.

3. The grasping apparatus according to claim 2, wherein the bag member is housed inside the outer bag in a state relatively displaceable with respect to the outer bag.

4. The grasping apparatus according to claim 1, wherein the granular substance is ceramic fragments in which a shape of each of grains that make up the granular substance is a shape other than generally spherical.

* * * * *